(12) United States Patent  
Riedijk et al.

(10) Patent No.: US 12,056,307 B2  
(45) Date of Patent: Aug. 6, 2024

(54) FINGERPRINT SENSOR WITH COLUMN READ-OUT

(71) Applicant: FINGERPRINT CARDS ANACATUM IP AB, Gothenburg (SE)

(72) Inventors: Frank Riedijk, Delft (NL); Wouter Brevet, Delft (NL); Hans Thörnblom, Hålta (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/255,386

(22) PCT Filed: Dec. 16, 2021

(86) PCT No.: PCT/SE2021/051273  
§ 371 (c)(1),  
(2) Date: Jun. 1, 2023

(87) PCT Pub. No.: WO2022/139662  
PCT Pub. Date: Jun. 30, 2022

(65) Prior Publication Data  
US 2024/0028154 A1 Jan. 25, 2024

(30) Foreign Application Priority Data

Dec. 22, 2020 (SE) .................................. 2051526-8

(51) Int. Cl.
| | | |
|---|---|---|
| *G06F 3/041* | (2006.01) | |
| *G06F 3/044* | (2006.01) | |
| *G06V 40/13* | (2022.01) | |

(52) U.S. Cl.  
CPC ........ *G06F 3/04164* (2019.05); *G06F 3/0446* (2019.05); *G06V 40/1306* (2022.01)

(58) Field of Classification Search  
None  
See application file for complete search history.

(56) References Cited

U.S. PATENT DOCUMENTS 10,452,166 B2 * 10/2019 Chen ...................... G06F 3/0446  
11,062,110 B2 * 7/2021 Chung ............... G06V 40/1365  
(Continued)

FOREIGN PATENT DOCUMENTS

WO 2008004314 A1 1/2008

OTHER PUBLICATIONS

International Search Report and Written Opinion for International Application No. PCT/SE2021/051273, dated Feb. 9, 2022.  
(Continued)

*Primary Examiner* — Amy Onyekaba  
(74) *Attorney, Agent, or Firm* — Westman, Champlin & Koehler, P.A.

(57) ABSTRACT

A fingerprint sensor comprising a plurality of sensing elements distributed across a rectangular sensing area with mutually opposite short sides and mutually opposite long sides, the sensing elements being arranged in a plurality of rows and a plurality of columns; readout circuitry arranged in a readout area located adjacent to a short side of the sensing area; and a plurality of readout lines for connecting each of the sensing elements to the readout circuitry, the readout lines in the plurality of readout lines extending in parallel to the long sides of the sensing area. For each column of sensing elements in the plurality of columns, at least a first sensing element and a second sensing element in the column are simultaneously connectable to the readout circuitry via a first readout line and a second readout line, respectively, in the plurality of readout lines.

12 Claims, 9 Drawing Sheets

(56) References Cited

U.S. PATENT DOCUMENTS

| | | | |
|---|---|---|---|
| 11,275,920 B1* | 3/2022 | Sargent | G06F 1/1684 |
| 2008/0224913 A1 | 9/2008 | Suzuki et al. | |
| 2013/0308838 A1 | 11/2013 | Westerman et al. | |
| 2015/0071511 A1* | 3/2015 | Wang | G06V 40/1306 |
| | | | 382/124 |
| 2015/0248574 A1 | 9/2015 | Mrazek et al. | |
| 2017/0126993 A1 | 5/2017 | Madurawe | |
| 2018/0032781 A1 | 2/2018 | Mainguet et al. | |
| 2018/0224955 A1* | 8/2018 | Chen | G06F 3/0416 |
| 2018/0253587 A1 | 9/2018 | Lowe | |
| 2018/0330139 A1 | 11/2018 | Yang et al. | |
| 2018/0349662 A1* | 12/2018 | Lin | A61B 5/7225 |
| 2019/0034024 A1 | 1/2019 | Park et al. | |
| 2019/0286872 A1* | 9/2019 | Lu | G06V 40/1376 |
| 2020/0257427 A1 | 8/2020 | Lai et al. | |
| 2020/0364438 A1* | 11/2020 | Hung | G06V 40/1318 |

OTHER PUBLICATIONS

Jessica Dolcourt, "Samsung Galaxy S10E review: Overlooking Samsung's cheapest phone would be a mistake", Published May 10, 2019 on http://www.cnet.com/reviews/samsung-galaxy-s10e-updated-review/2/, Retrieved Aug. 27, 2021 from https://web.archive.org/web/20190510190154/https://www.cnet.com/reviews/samsung-galaxy-s10e-updated-review/2/; whole document.
Communication pursuant to Rule 164(1) EPC, for European Patent Application No. 21911673.8, dated May 10, 2024, 13 pages.

* cited by examiner

FINGERPRINT SENSOR WITH COLUMN READ-OUT

CROSS-REFERENCE TO RELATED APPLICATION

This Application is a Section 371 National Stage Application of International Application No. PCT/SE2021/051273, filed Dec. 16, 2021, which claims priority to Swedish Patent Application No. 2051526-8 filed on Dec. 22, 2020, and published as WO 2022/139662 A1 on Jun. 30, 2022, in English, the entire contents of which are hereby incorporated by reference in their entireties.

FIELD OF THE INVENTION

The present invention relates to a fingerprint sensor, to a fingerprint sensor arrangement with a non-flat finger receiving surface, and to an electronic device.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released personal communication devices, such as mobile phones.

Many electronic devices have various curved surfaces for providing an improved user experience. It would be desirable to provide for improved integration of fingerprint sensing capability in such electronic devices.

SUMMARY

In view of the above, it is an object of the present invention to provide for improved integration of fingerprint sensing capability in an electronic device having at least one curved surface portion.

According to the present invention, it is therefore provided a fingerprint sensor comprising: a plurality of sensing elements distributed across a rectangular sensing area with mutually opposite short sides and mutually opposite long sides, the sensing elements being arranged in a plurality of rows extending in parallel to the short sides and a plurality of columns extending in parallel to the long sides; readout circuitry arranged in a readout area located adjacent to a short side of the sensing area; and a plurality of readout lines for connecting each of the sensing elements to the readout circuitry, the readout lines in the plurality of readout lines extending in parallel to the long sides of the sensing area, wherein, for each column of sensing elements in the plurality of columns, at least a first sensing element and a second sensing element in the column are simultaneously connectable to the readout circuitry via a first readout line and a second readout line, respectively, in the plurality of readout lines.

The present invention is based on the general realization that it would be beneficial to enable a non-flat topography of a finger receiving surface, in an electronic device using a capacitive fingerprint sensor in which the sensing structures are arranged in a sensing plane. The present inventors have further realized that the sensing performance of a fingerprint sensor in such a configuration can be improved by using different fingerprint sensing settings for different parts of the sensing area, and that the implementation of this may be facilitated, for an elongated fingerprint sensor, if sensing elements in the same column can be read out simultaneously.

Hereby, it becomes easier to achieve a more uniform signal strength baseline across the sensing plane, which in turn provides for improved fingerprint image quality, which can be translated to improved biometric authentication performance of the electronic device in which the fingerprint sensor according to embodiments of the present invention is integrated.

It should be noted that the fingerprint sensor according to embodiments of the present invention may not only be beneficial for use in a fingerprint sensor arrangement of the above-mentioned type, having a dielectric coating with a non-uniform thickness profile, but also for other configurations, in which the finger receiving surface may be flat. For instance, the ability to simultaneously read out sensing signals from sensing elements arranged in the same column of an elongated fingerprint sensor may facilitate the use of different sensing configurations close to the long sides of the sensing area than in the interior of the sensing area, to deal with edge effects.

According to various embodiments, the fingerprint sensor may be configured to apply first fingerprint sensing settings when the readout circuitry reads out sensing signals from sensing elements in a first column; and apply second fingerprint sensing settings, different from the first fingerprint sensing settings, when the readout circuitry reads out sensing signals from sensing elements in a second column.

In embodiments, the readout circuitry may be configured to: read out sensing signals from sensing elements in the first column using first readout circuitry settings; and read out sensing signals from sensing elements in the second column using second readout circuitry settings, different from the first readout circuitry settings.

The fingerprint sensor according to embodiments of the present invention may advantageously be included in a fingerprint sensor arrangement, further comprising dielectric material covering the sensing plane of the fingerprint sensor, the dielectric material having a non-uniform thickness profile defining the topography of the finger receiving surface of the fingerprint sensor arrangement.

The dielectric material could, for example, be provided in the form of a suitably shaped window against which a planar surface of a fingerprint sensor according to embodiments of the present invention is pressed or glued. Alternatively, or in combination, the dielectric material may be molded on the sensing surface of the fingerprint sensor, whereby it can practically be ensured that there is no air gap between the sensing plane and the finger receiving surface.

In embodiments of the fingerprint sensor arrangement according to the present invention, a cross-section of the finger receiving surface with a plane parallel to a short side of the sensing area may be convex exhibiting a first radius of curvature; and a cross-section of the finger receiving surface with a plane parallel to a long side of the sensing area may exhibit a second radius of curvature greater than the first radius of curvature.

The fingerprint sensor arrangement according to embodiments of the present invention may be included in an electronic device, further comprising a device housing with a curved portion having an opening, wherein the fingerprint sensor arrangement is arranged in the opening of the curved portion of the device housing.

According to a second aspect of the present invention, it is provided a method of operating a fingerprint sensor according to embodiments of the present invention, wherein the sensing area of the fingerprint sensor has a longitudinal symmetry line parallel to the long sides of the sensing area, the method comprising the steps of: reading out sensing signals from sensing elements in a first column at a first distance from the longitudinal symmetry line; and after having read out the sensing signals from the sensing signals in the first column, reading out sensing signals from sensing elements in columns on both sides of the longitudinal symmetry line, at distances from the longitudinal symmetry line being greater than the first distance.

Embodiments of the method according to the invention may be particularly beneficial in fingerprint sensor arrangements where the dielectric material covering the sensing area is thicker at the longitudinal symmetry line than at the long sides of the sensing area. Since the finger surface will then typically touch the finger receiving surface at the longitudinal symmetry line before touching the finger receiving surface at the long sides of the sensing area, it may be beneficial to read out from sensing elements at the longitudinal symmetry line before reading out from sensing elements at the long sides of the sensing area. This may be especially beneficial when acquiring fingerprint representations of wet fingers using capacitive sensing.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensor according to the present invention are mainly described with reference to a fingerprint sensor arrangement in the form of a fingerprint sensor component including a semiconductor-based capacitive fingerprint sensor integrated circuit (IC). It should be noted that the fingerprint sensor arrangement according to embodiments of the present invention need not be overmolded by dielectric material, and that the topography of the finger receiving surface could alternatively be achieved using a separate part attached to or suitably arranged in relation to the fingerprint sensor. Furthermore, the finger receiving surface of the fingerprint sensor arrangement is mainly exemplified as a convex surface. It should be noted that the finger receiving surface may be concave, partly convex and partly concave, or flat but inclined in relation to the sensing plane, etc. Furthermore, it should be understood that the mobile phone 1 in the figures is only one example of an electronic device comprising the fingerprint sensor according to embodiments of the present invention. The fingerprint sensor according to embodiments of the present invention may advantageously be included in many other electronic devices, including, for example, computers, electronic watches and other gadgets, as well as smart cards, etc.

Figure 1:
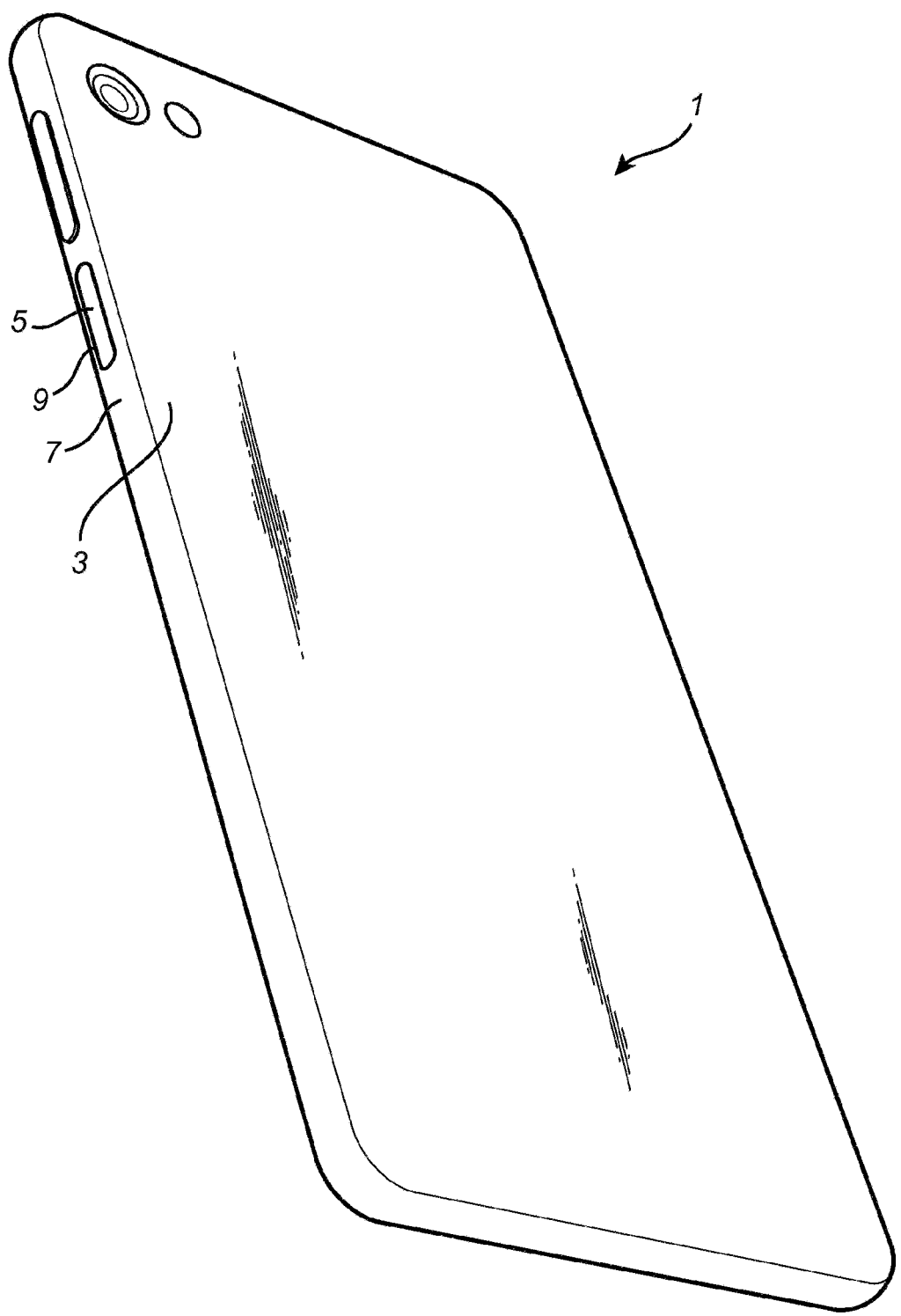
FIG. 1 is an illustration of an exemplary electronic device comprising a fingerprint sensor arrangement according to an embodiment of the present invention, in the form of a mobile phone.

FIG. 1 schematically shows an electronic device, here in the form of a mobile phone 1, comprising a device housing 3 and a fingerprint sensor arrangement, here in the form of fingerprint sensor component 5. As can be seen in FIG. 1, the device housing 3 has a convex portion 7 with an opening 9. The fingerprint sensor component 5 is arranged in the opening 9 and also exhibits a convex shape. The convex shape of the fingerprint sensor component 5 may substantially follow the convex shape of the convex portion 7 of the device housing 3, at least at the opening 9. This is better seen in the partial enlargement in FIG. 2.

Figure 2:
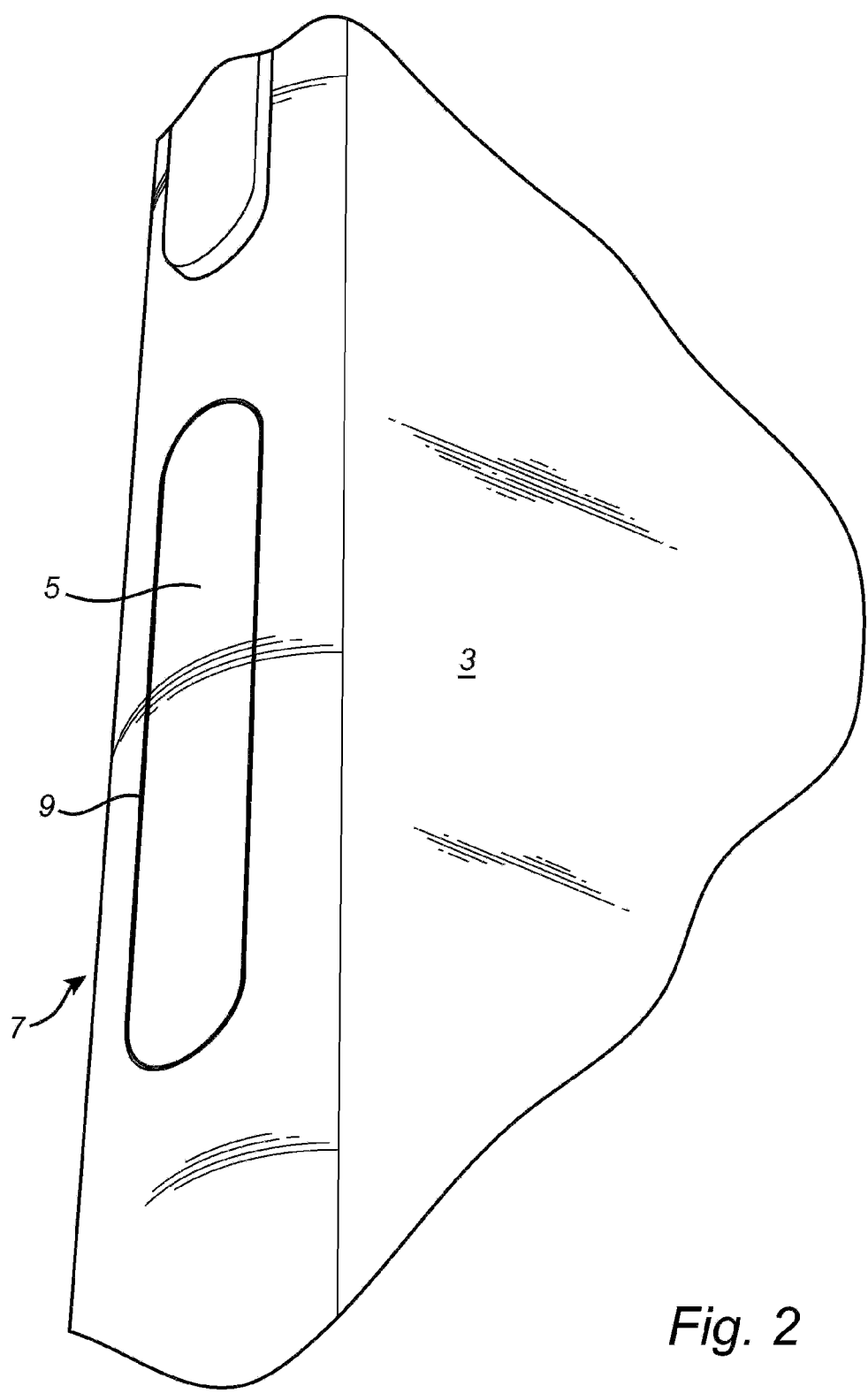
FIG. 2 is an enlarged view of a portion of the electronic device in FIG. 1.
Figure 3A:
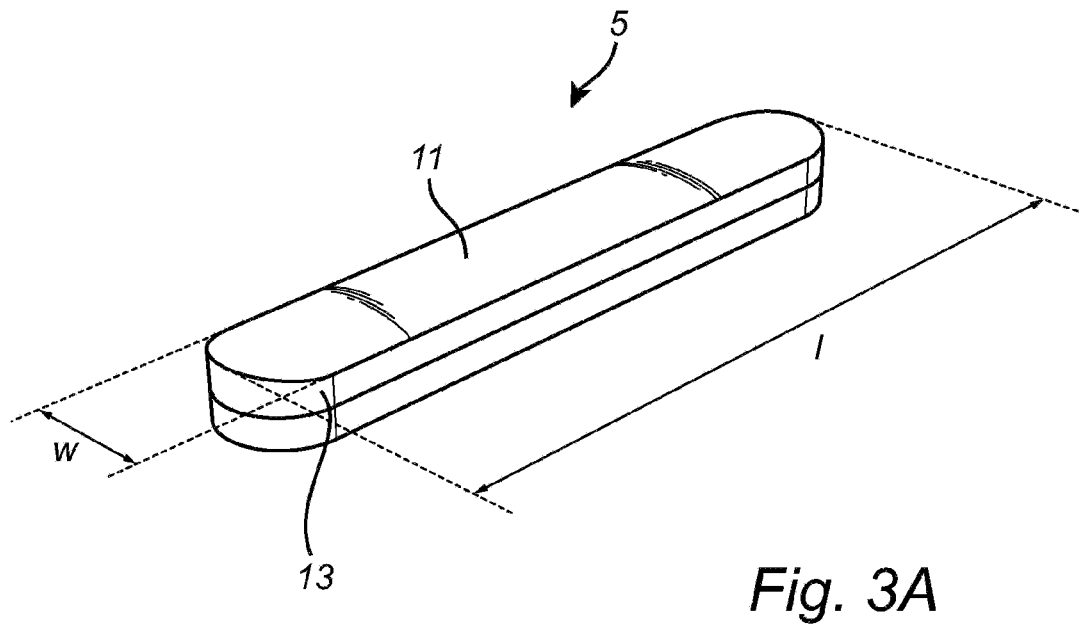
FIGS. 3A-B are perspective views of the fingerprint sensor arrangement comprised in the mobile phone in FIG. 1 and FIG. 2.
Figure 3B:
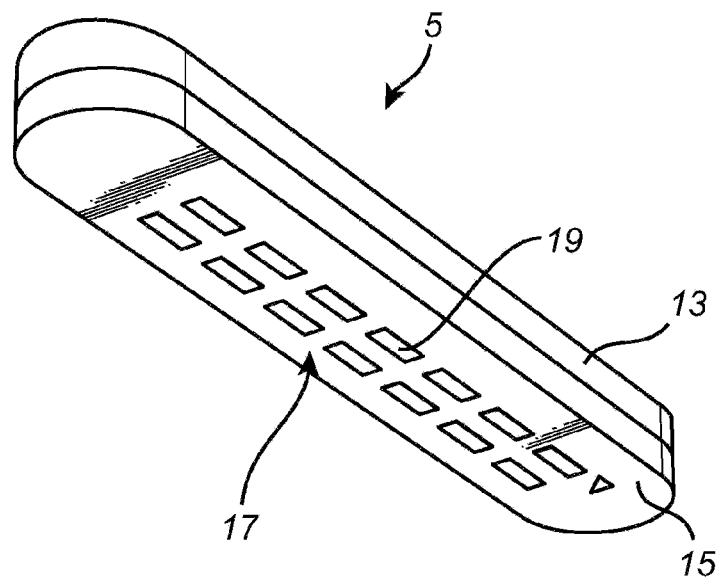

FIGS. 3A-B are perspective views of the fingerprint sensor component 5 comprised in the mobile phone 1 in FIG. 1 and FIG. 2.

FIG. 3A is a perspective view showing a component top face 11 and a side surface 13 of the fingerprint sensor component 5. As can be seen in FIG. 3A, the fingerprint sensor component 5 in this particular example configuration is elongated having a length l and a width w.

FIG. 3B is a perspective view showing a component bottom face 15 and the side surface 13 of the fingerprint sensor component 5. As can be seen in FIG. 3B, the fingerprint sensor component 5 has a component conductor pattern 17 on the component bottom face 15. In the embodiment of FIG. 3B, the component conductor pattern 17 defines a land grid array with a plurality of component connection pads 19 (only one of these is indicated by a reference numeral in FIG. 3B to avoid cluttering the drawing).

Figure 4:
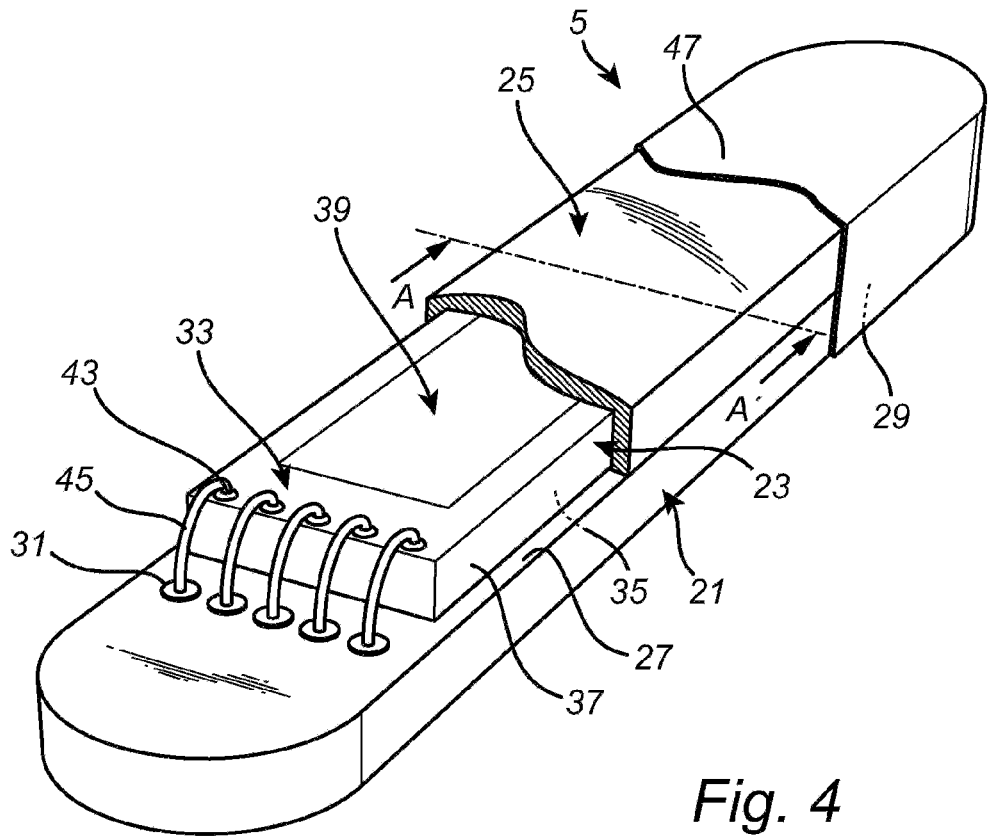
FIG. 4 is a partly opened perspective schematic illustration of the fingerprint sensor arrangement comprised in the mobile phone in FIG. 1 and FIG. 2.

FIG. 4 is a partly opened perspective schematic illustration of the fingerprint sensor component 5 comprised in the mobile phone 1 in FIG. 1, and shown in FIG. 3A and FIG. 3B.

Referring to FIG. 4, the fingerprint sensor component 5 comprises a substrate 21, a fingerprint sensor die 23, and a molding material 25. The substrate 21 has a substrate top face 27 and a substrate bottom face 29. The substrate top face 27 has a top face conductor pattern, including the bond pads 31 visible in FIG. 4, and (although not visible in FIG. 4) the substrate bottom face 29 has a bottom face conductor pattern, which may constitute the component conductor pattern 17 described above with reference to FIG. 3B. The fingerprint sensor die 23 has a die top face 33, a die bottom face 35, and a side surface 37 connecting the die top face 33 and the die bottom face 35. The die top face 33 includes a planar sensing surface 39. The die bottom face of the fingerprint sensor die 23 is bonded to the substrate top face 27 of the substrate 21. As is schematically indicated in FIG. 4, the fingerprint sensor die 23 further comprises die connection pads 43, which are electrically connected to the bond pads 31 on the substrate top face 27 of the substrate 21. This electrical connection may be achieved using bond wires 45 as indicated in FIG. 4, or by any other suitable connector known to the skilled person. The molding material 25 covers the sensing surface 39 and the side surface 37 of the fingerprint sensor die 23, as well as a portion of the substrate top face 27 of the substrate 21 that is not covered by the fingerprint sensor die 23. As is schematically indicated in FIG. 4, the molding material 25 exhibits a convex shape over the sensing surface 39 of the fingerprint sensor die 23. As is schematically indicated in FIG. 4, the fingerprint sensor component may optionally additionally include a colored coating 47 on top of the molding material 25.

Figure 5:
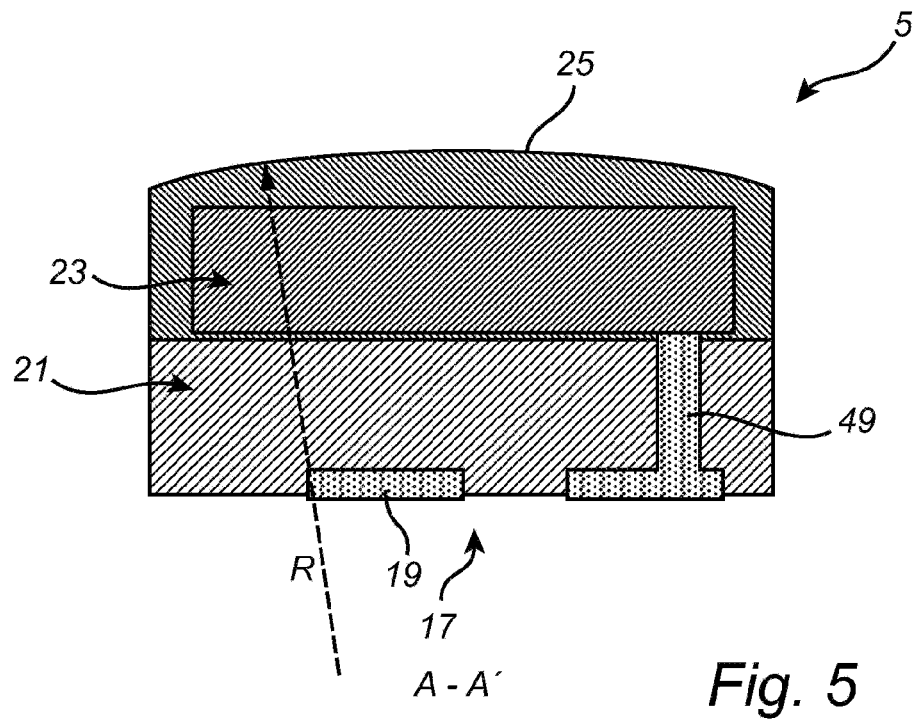
FIG. 5 is a schematic cross-section view of the fingerprint sensor arrangement in FIG. 4.

FIG. 5 is a schematic cross-section view of the fingerprint sensor component 5 in FIG. 4, of a section taken along the line A-A' in FIG. 4. In addition to what has already been described above with reference to FIG. 4, FIG. 5 schematically shows a via 49 electrically connecting the top face conductor pattern of the substrate 21 with the bottom face conductor pattern 17 of the substrate 21.

FIG. 5 also indicates an advantageous configuration of the convex shape of the molding material 25. As is indicated in FIG. 5, the top surface of the fingerprint sensor component 5 exhibits a convex shape with a radius R of curvature. The radius R of curvature of the fingerprint sensor component 5 may be adapted to substantially follow a radius of curvature of the convex portion 7 of the device housing 3 of the electronic device 1. In the length direction of the fingerprint sensor component 5, the finger receiving surface may exhibit a substantially greater, such as at least four times greater, radius of curvature than the radius R of curvature in the width direction as shown in FIG. 5, at least over the sensing surface 39 of the fingerprint sensor 23.

FIGS. 6A-D illustrate a partial readout sequence for the fingerprint sensor 23 according to an embodiment of the present invention. As can be seen in the illustrations, the fingerprint sensor 23 is rectangular and bounded by mutually opposite short edges 30a-b and mutually opposite long edges 32a-b. The fingerprint sensor 23 comprises a plurality of sensing elements 50, readout circuitry 51, and a plurality of readout lines 52a-h for connecting each of the sensing elements 50 to the readout circuitry 51. The sensing elements 50 are distributed across a rectangular sensing area 36 with mutually opposite short sides 54a-b and mutually opposite long sides 55a-b, and are arranged in a plurality of rows 56 extending in parallel to the short sides 54a-b and a plurality of columns 58 extending in parallel to the long sides 55a-b. The readout circuitry 51 is arranged in a readout area located adjacent to a short side 54a-b of the sensing area, between the sensing area 36 and the lower short edge 30a of the fingerprint sensor 23. The plurality of readout lines 52a-h extend in parallel to the long sides 55a-b of the sensing area 36. For each column 58 of sensing elements 50 in the plurality of columns, at least a first sensing element and a second sensing element in the column are simultaneously connectable to the readout circuitry 51 via a first readout line and a second readout line, respectively, in the plurality of readout lines 52a-h.

According to an example embodiment of the present invention, the number of readout lines 52a-h may be the same as the number of columns 58, and the readout lines 52a-h may be evenly distributed across the width of the sensing area 36, as is schematically indicated in FIGS. 6A-D. This may be beneficial for reducing the impact of cross-talk and for ensuring that any impact of the readout lines 52a-h on the sensing elements 50 will be as uniform as possible across the sensing area 36. It should, however, be noted that embodiments of the fingerprint sensor 23 may have a smaller or larger number of readout lines 52a-h, in relation to the number of columns 58, and that the readout lines 52a-h need not be evenly distributed, or even in the sensing area 36. It may, for example, be beneficial to provide the fingerprint sensor 23 with a larger number of readout lines 52a-h than the number of columns 58 to allow simultaneous readout of sensing signals from a larger number of sensing elements 50. For example, there may be two readout lines per column 58 or the number of readout lines may be the equal to (or greater) than the number of rows 56.

To aid the description of the functionality of the fingerprint sensor 23 according to embodiments of the present invention, the illustrations in FIGS. 6A-D are of a simplified and schematic sensor configuration with only sixteen rows 56 and eight columns 58. In most applications, the numbers of rows 56 and columns 58 are far greater.

With reference to FIGS. 6A-D, an exemplary readout sequence for two columns 58 will be described. The columns 58 from which sensing signals are first read out, in this particular example, are the columns closest to the longitudinal symmetry line 34 of the sensing area 36 of the fingerprint sensor 23. Although not shown in the figures, its should be understood that it may be beneficial to continue the readout by reading out sensing signals from sensing elements 50 in columns 58 at increasing distances from the longitudinal symmetry line 34, towards the long sides 55a-b of the sensing area 36. This may especially be the case where the fingerprint sensor 23 is included in a fingerprint sensor arrangement 5 such as that described further above, where the thickness of the dielectric material 25 covering the sensing area 36 is the greatest along the longitudinal symmetry line 34 of the sensing area 36.

Figure 6A:
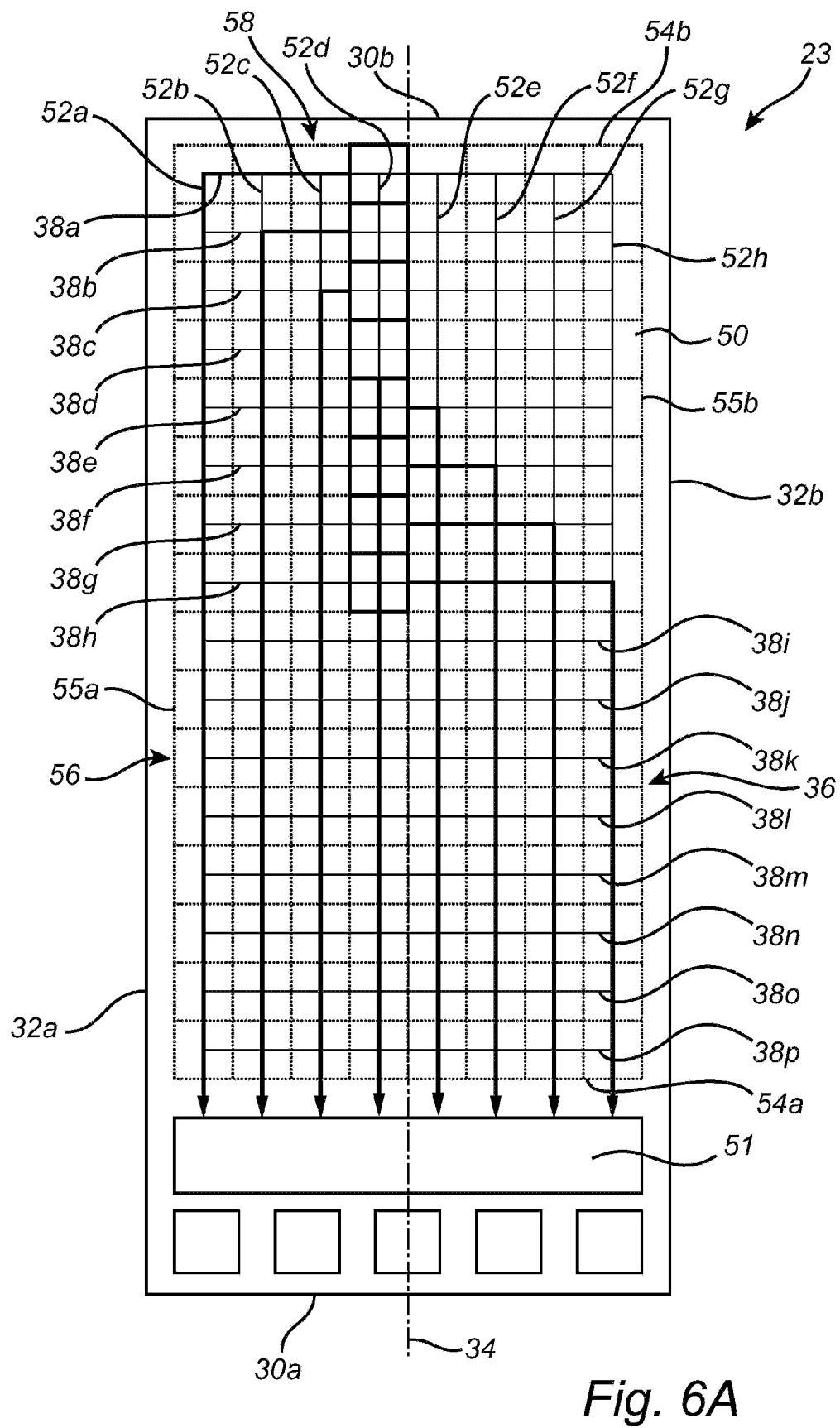
FIGS. 6A-D illustrate a partial readout sequence for the fingerprint sensor according to an embodiment of the present invention.

Referring first to FIG. 6A, the first eight sensing elements from the top in the fourth column from the left are coupled to the readout lines 52a-h by means of respective row lines 36a-h. Through the row lines 38a-h and the readout lines 52a-h, the sensing signals from the first eight sensing elements can be simultaneously received by the readout circuitry 51.

These first eight sensing elements may all be read out while applying first fingerprint sensing settings. Sensing elements in another column closer to a long side 55a-b of the sensing area 36 may advantageously be read out while applying other fingerprint sensing settings, as will be described in greater detail further below.

Figure 6B:
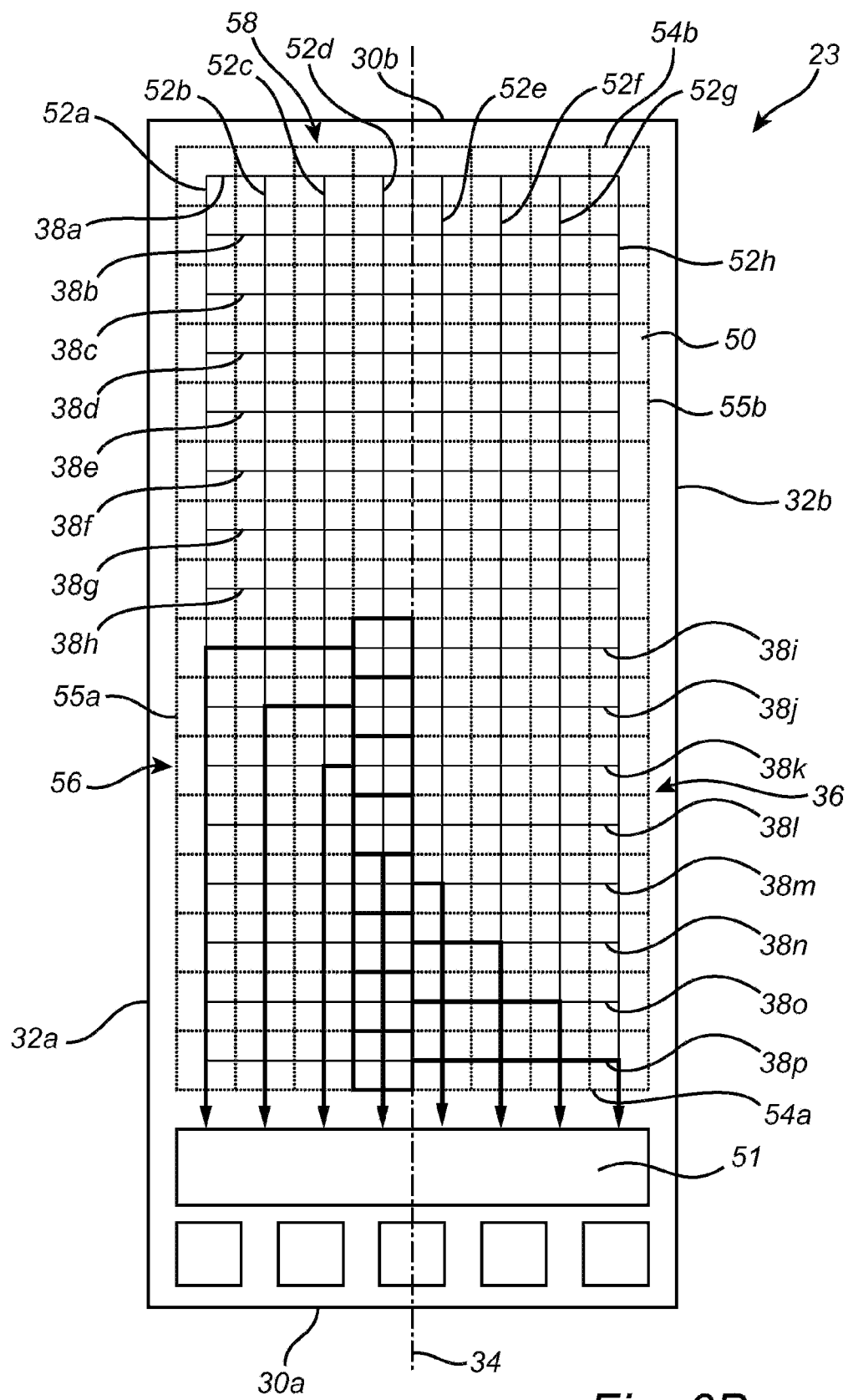

Turning now to FIG. 6B, the next (in this case last) set of eight sensing elements in the fourth column from the left are coupled to the readout lines 52a-h by means of respective row lines 38i-p. Through the row lines 38i-p and the readout lines 52a-h, the sensing signals from the next set of eight sensing elements can be simultaneously received by the readout circuitry 51. The sensing elements in this next set of sensing elements may be read out while applying the first fingerprint sensing settings.

Figure 6C:
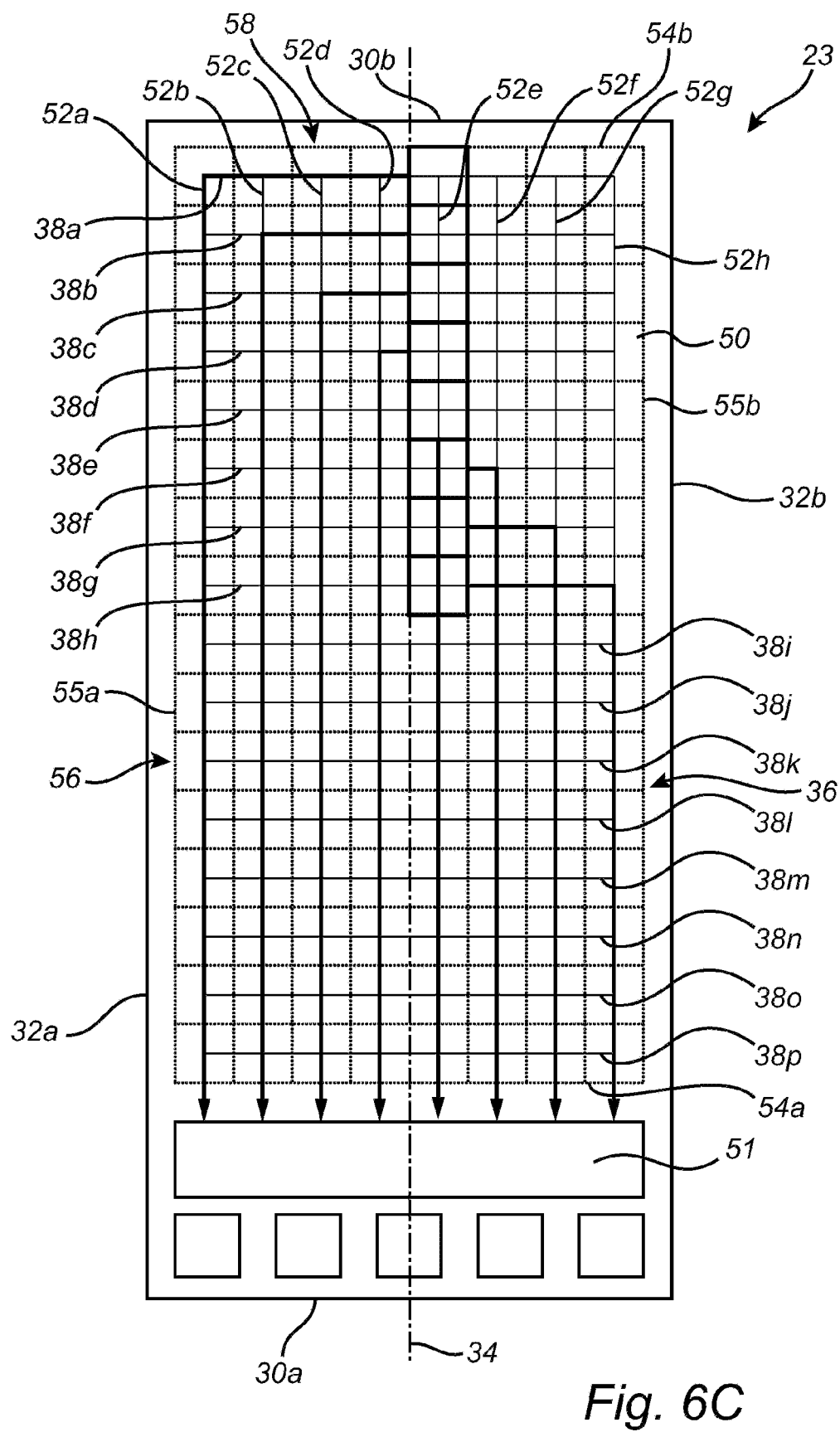

As is indicated in FIG. 6C, the first eight sensing elements from the top in the fifth column from the left are then coupled to the readout lines 52a-h by means of respective row lines 36a-h. Through the row lines 38a-h and the readout lines 52a-h, the sensing signals from the first eight sensing elements can be simultaneously received by the readout circuitry 51.

These first eight sensing elements may all be read out while applying first fingerprint sensing settings, since the fifth column is at the same distance from the longitudinal symmetry line 34 as the fourth column.

Figure 6D:
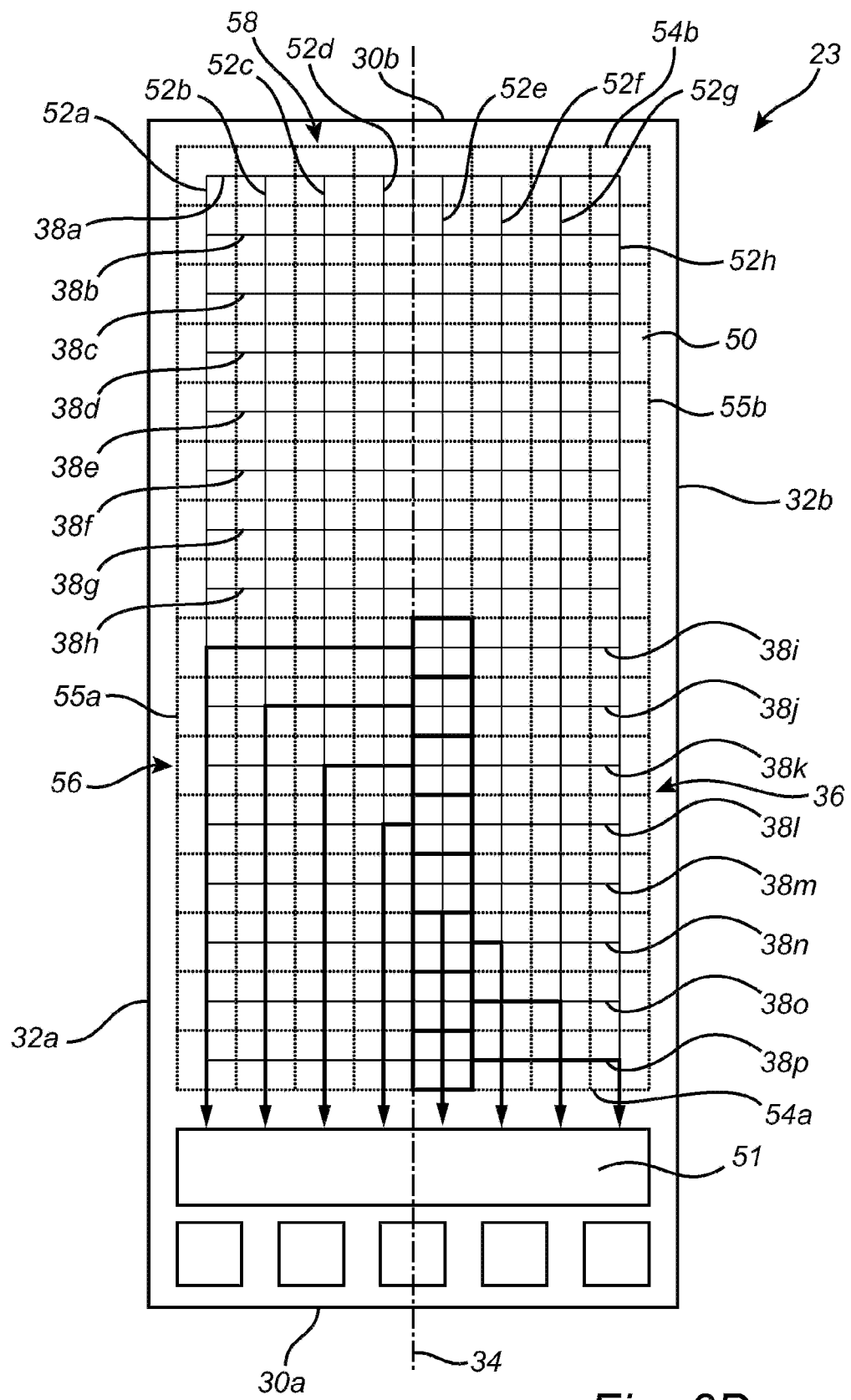

Turning now to FIG. 6D, the next (in this case last) set of eight sensing elements in the fifth column from the left are coupled to the readout lines 52a-h by means of respective row lines 38*i-p*. Through the row lines 38*i-p* and the readout lines 52*a-h*, the sensing signals from the next set of eight sensing elements can be simultaneously received by the readout circuitry 51. The sensing elements in this next set of sensing elements may be read out while applying the first fingerprint sensing settings.

The procedure described above may typically be continued until sensing signals from all sensing elements 50 in the sensing area 36 have been received by the readout circuitry 51. Thereafter, a fingerprint representation can be formed based on the readout signals.

The row lines 38*a-p* may be selectively connectable to each sensing element 50 in its respective row 56, for example by means of a controllable selection switch in the each sensing element 50.

In FIGS. 6A-D, the readout circuitry 51 is arranged on one side only of the sensing area 36, adjacent to the first short side 54*a* of the sensing area 36. In other embodiments, the readout circuitry 51 may be distributed, so that a first portion of the readout circuitry 51 is arranged adjacent to the first short side 54*a* and a second portion of the readout circuitry 51 is arranged adjacent to the second short side 54*b*, between the second short side 54*b* and the second edge 30*b* of the fingerprint sensor 23. In such embodiments, a first set of readout lines may go to the first portion of the readout circuitry and a second set of readout line may go to the second portion of the readout circuitry. For instance, referring to FIGS. 6A-D, it may be beneficial to split each readout line 52*a-h* indicated there into two equally long "half" readout lines, and connect the bottom half readout lines to the first portion of the readout circuitry and the top half readout lines to the second portion of the readout circuitry.

Figure 7:
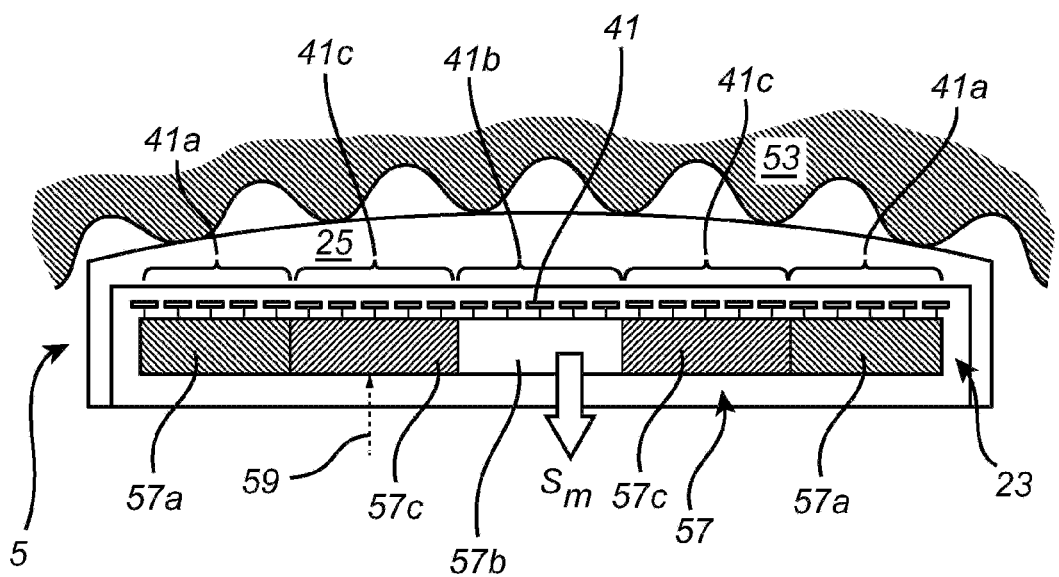
FIG. 7 schematically illustrates a further embodiment of the fingerprint sensor according to the present invention.

FIG. 7 is a schematic cross-section view of a fingerprint sensor arrangement 5 comprising a fingerprint sensor 23 according to an embodiment of the present invention, and dielectric material 25 having a non-uniform thickness profile defining a topography, in this case a convex topography, of a finger receiving surface 51 of the fingerprint sensor arrangement 5. The fingerprint sensor 23 comprises a plurality of electrically conductive sensing structures, here in the form of metal plates 41 arranged in a uniform array configuration in a sensing plane—the above-mentioned sensing surface 39—for capacitively sensing a fingerprint of a finger 53 placed on the finger receiving surface 51 of the fingerprint sensor arrangement 5. The example embodiment of the fingerprint sensor 23 is indicated as having a larger number of columns than the embodiment in FIGS. 6A-D. It should be noted that each sensing element 50 indicated in FIGS. 6A-D may comprise a conductive sensing structure 41 as indicated in FIG. 7.

The plurality of electrically conductive sensing structures 41 includes a first set 41*a*, a second set 41*b*, and a third set 41*c* of sensing structures. the first set 41*a* of sensing structures is arranged to be covered by a thickness of the dielectric material 25 within a first thickness range $d_1$-$d_2$, the second set 41*b* of sensing structures is arranged to be covered by thickness of the dielectric material 25 within a second thickness range $d_3$-$d_4$, only including greater thicknesses than the first thickness range $d_1$-$d_2$, and the third set 41*c* of sensing structures is arranged to be covered by thickness of the dielectric material 25 within a third thickness range $d_2$-$d_3$, between the first thickness range and the second thickness range.

The capacitive coupling between a sensing structure 41 of the fingerprint sensor 23 and a finger 53 placed on the finger receiving surface 51 is a measure of the capacitance of the capacitor formed by the sensing structure 41, the finger 53, and the dielectric material 25 between the sensing structure 41 and the finger surface. In the configuration in FIG. 7, the maximum capacitance (resulting from a ridge of the finger pattern in good contact with the finger receiving surface 51) can be considered to be proportional to the surface area of the sensing structure 41 and inversely proportional to the distance between the sensing structure and the finger surface.

As is schematically indicated in FIG. 7, the fingerprint sensor 23 further comprises measurement circuitry 57 coupled to the sensing structures 41 for providing measurement signals Sm indicative of the capacitive coupling between the sensing structures 41 and the finger 53.

In FIG. 7, the measurement circuitry 57 is arranged to exhibit three different fingerprint sensing settings, conceptually indicated as three different measurement circuitry configurations 57*a-c*, schematically shown as different blocks comprised in the total measurement circuitry 57. It should be appreciated that this is only an illustration to aid the understanding of this embodiment, and that the measurement circuitry does not necessarily have different configurations in different parts thereof.

The measurement circuitry 57 in the fingerprint sensor 23 in FIG. 7 is thus arranged to provide, using the first measurement circuitry configuration 57*a*, a first set of measurement signals resulting from capacitive coupling between the first set 41*a* of sensing structures and the finger 53, a second set of measurement signals resulting from capacitive coupling between the second set 41*b* of sensing structures and the finger 53, and a third set of measurement signals resulting from capacitive coupling between the third set 41*c* of sensing structures and the finger 53. The measurement signals Sm provided by the measurement circuitry 57 may be a compilation of the first, second, and third sets of measurement signals.

The different configurations 57*a-c* of the measurement circuitry 57 can be permanent, or the measurement circuitry 57 can be controllable to change measurement circuitry configuration for all of the sensing structures 41, or for various sets of the sensing structures. This optional controllability of the configuration of the measurement circuitry is schematically indicated by the dashed arrow 59 in FIG. 7. Accordingly, the measurement circuitry 57 may be arranged to provide the first set of measurement signals, the second set of measurement signals, and the third set of measurement signals (if applicable) during a fingerprint capture operation to allow formation of a fingerprint representation Sm comprising the first set of measurement signals, the second set of measurement signals, and the third set of measurement signals (if applicable). With additional reference to FIGS. 6A-D, the measurement circuitry 57 (which may be considered to include the readout circuitry 51) may be arranged to use the second measurement circuitry configuration 57*b* when reading out the sensing signals from the sensing elements 50 in the columns 58 closest to the longitudinal symmetry line 34, and to use the first 57*a* measurement circuitry configuration when reading out the sensing signals from the sensing elements 50 in the columns 58 closest to the long sides 55*a-b* of the sensing area 36.

In a given measurement circuitry configuration, one or more properties of the measurement circuitry 57 may be adapted to the non-uniform thickness profile of the dielectric material 25 intended to cover the sensing plane 39 of the fingerprint sensor 23. For example, parameters such as offset, gain, or timing may be different for different sensing structures 41, depending on the intended non-uniform thickness profile of the dielectric material 25. For instance, the offset and/or gain and/or measurement timing may be set to compensate for sensitivity variations across the fingerprint sensor 23, resulting from the non-uniform thickness profile. When implementing such different measurement configurations, it is advantageous to be able to simultaneously read out sensing signals from sensing elements 50 in the same column 58. This may be particularly be the case when different measurement configurations involve different timing, such as different for performing the sensing operation. Furthermore, common mode correction per column may also be beneficial.

The fingerprint sensor arrangement 5 may be comprised in a fingerprint sensing system, further comprising a fingerprint sensor controller that is coupled to the fingerprint sensor 23 for controlling operation of the fingerprint sensor 23. The fingerprint sensor controller is not explicitly shown in the drawings, but as will be clear to a person of ordinary skill in the art, the fingerprint sensor controller may be included in an electronic device, such as the mobile phone 1 in FIG. 1. The above-mentioned fingerprint sensing system may thus partly comprise circuitry included in the electronic device. According to one embodiment, the fingerprint sensor controller may be included in a fingerprint sensor module that is integrated in the electronic device (mobile phone 1), and according to another embodiment, the functionality of the fingerprint sensor controller may at least partly be realized by the host controller of the electronic device.

In embodiments, the fingerprint sensor controller may be configured to control, by means of control signals 59, the measurement circuitry 57 of the fingerprint sensor 23 to provide initial measurement signals using an initial set of measurement circuitry configurations. Based on the initial measurement signals, the fingerprint sensor controller may determine the first measurement circuitry configuration 57a, the second measurement circuitry configuration 57b, and the third measurement configuration 57c (where applicable), and control, by means of control signals 59, the measurement circuitry 57 to provide the first set of measurement signals using the first measurement circuitry configuration 57a, the second set of measurement signals using the second measurement circuitry configuration 57b, and the third set of measurement signals using the third measurement configuration 57c (where applicable).

Figure 8:
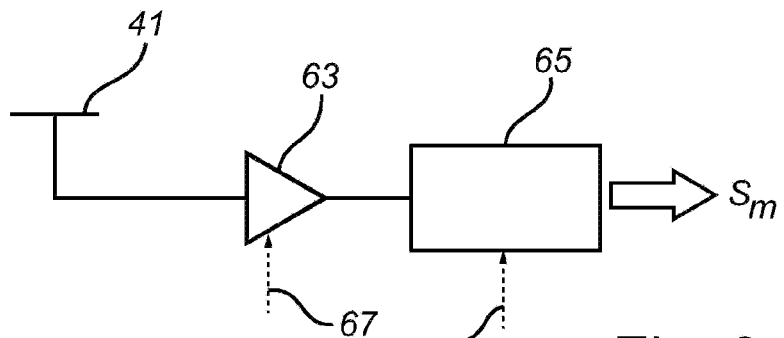
FIG. 8 schematically shows a first example configuration of the measurement circuitry in the fingerprint sensor in FIG. 7.

FIG. 8 schematically shows a first example configuration of the measurement circuitry 57 in the fingerprint sensor in FIG. 7, comprising amplifier circuitry 63 and analog-to-digital converter (ADC) circuitry 65. The measurement circuitry 57 may include circuitry in each sensing element 50 as well as circuitry in the readout circuitry 51 in FIGS. 6A-D. As is schematically indicated in FIG. 8, the amplifier circuitry receives input from one or several sensing structures 41, and provides an amplified analog signal to the ADC circuitry 65. The ADC circuitry 65 outputs digital measurement signals Sm. To provide different measurement circuitry configurations for different parts of the fingerprint sensor 23, the amplifier circuitry 63 and/or the ADC circuitry 65 may exhibit different properties for sensing structures 41 located in these different parts of the fingerprint sensor 23. To that end, the amplifier circuitry 63 and/or the ADC circuitry 65 may be structured differently for sensing structures 41 located in different parts of the fingerprint sensor 23. Alternatively, the amplifier circuitry 63 may be controllable using one or more external analog and/or digital control signals (illustrated by the dashed arrow 67) and/or the ADC circuitry 65 may be controllable using one or more external control signals (illustrated by the dashed arrow 69).

Figure 9:
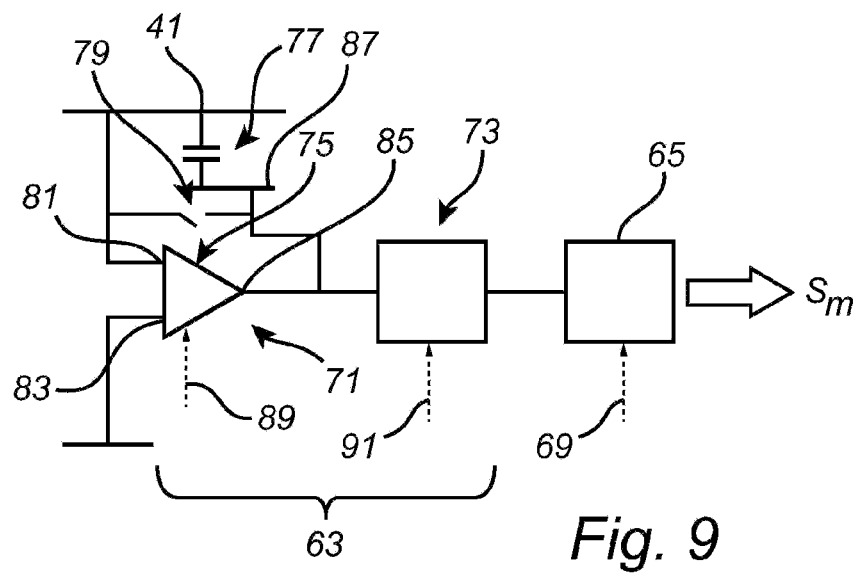
FIG. 9 schematically shows a second example configuration of the measurement circuitry in the fingerprint sensor in FIG. 7.

FIG. 9 schematically shows a second example configuration of the measurement circuitry in the fingerprint sensor in FIG. 7, in which the amplifier circuitry 63 is shown to comprise a charge amplifier 71, and a sample-and-hold amplifier 73. The charge amplifier 71 may include an operational amplifier 75, a feedback capacitor 77 and a reset switch 79. A first input 81 of the operation amplifier 75 may be connected to the sensing structure 41, and a second input 83 of the operation amplifier 75 may be connected to ground, or to a controllable voltage source depending on the overall configuration of the fingerprint sensor arrangement 5. The output 85 of the operational amplifier 75 is connected to the sample-and-hold amplifier 73, and feedback coupled to the first input 81 via the feedback capacitor 77 formed by the sensing structure 41 and a feedback plate 87. The charge amplifier 71 can be reset by operating the reset switch 79 to short-circuit the first input 81 and the output 85.

The amplifier circuitry 63, which may be included in each sensing element 50 in FIGS. 6A-D, may operate in a, per se, known manner to provide analog signals to the ADC circuitry 65. Properties of the amplifier circuitry 63 may, for example, be controlled using control signals affecting the offset of the operational amplifier (indicated by the dashed arrow 89), the measurement time (by controlling the timing of operation of the reset switch 79), or using control signals affecting the offset and/or gain of the sample-and-hold amplifier 73 (indicated by the dashed arrow 91). Alternatively, or in combination, different charge amplifiers 71 may permanently have different properties. For instance, the gain of the charge amplifier 71 is affected by the area of the feedback plate 87.

Although it is indicated in FIG. 8 and FIG. 9 that one amplifier circuit is connected to a single sensing structure 41, it should be noted that this is not necessarily the case, and that, for example, one amplifier circuit may be connected (selectively connectable) to a plurality of sensing structures 41.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fingerprint sensor comprising:
    a plurality of sensing elements distributed across a rectangular sensing area with mutually opposite short sides and mutually opposite long sides, the sensing elements being arranged in a plurality of rows extending in parallel to the short sides and a plurality of columns extending in parallel to the long sides;
    readout circuitry arranged in a readout area located adjacent to a short side of the sensing area; and
    a plurality of readout lines for connecting each of the sensing elements to the readout circuitry, the readout lines in the plurality of readout lines extending in parallel to the long sides of the sensing area,
    wherein, for each column of sensing elements in the plurality of columns, at least a first sensing element and a second sensing element in the column are simultaneously connectable to the readout circuitry via a first readout line and a second readout line, respectively, in the plurality of readout lines,
    wherein the number of readout lines is the same as the number of columns, or twice the number of columns, or the same as the number of rows, wherein the fingerprint sensor is configured to:
apply first fingerprint sensing settings when the readout circuitry reads out sensing signals from sensing elements in a first column; and
apply second fingerprint sensing settings, different from the first fingerprint sensing settings, when the readout circuitry reads out sensing signals from sensing elements in a second column.

2. The fingerprint sensor according to claim 1, wherein the readout circuitry is configured to:
read out sensing signals from sensing elements in the first column using first readout circuitry settings; and
read out sensing signals from sensing elements in the second column using second readout circuitry settings, different from the first readout circuitry settings.

3. The fingerprint sensor according to claim 1, wherein:
the first fingerprint sensing settings include a first setting for at least one of an offset, a gain, and timing of the sensing elements in the first column and/or the readout circuitry; and
the second fingerprint sensing settings include a second setting, different from the first setting, for at least one of the offset, the gain, and timing of the sensing elements in the second column and/or the readout circuitry.

4. The fingerprint sensor according to claim 1, wherein the readout lines in the plurality of readout lines are distributed across the sensing area.

5. The fingerprint sensor according to claim 1, wherein:
the fingerprint sensor is rectangular and bounded by mutually opposite short edges and mutually opposite long edges; and
the readout circuitry is located between the sensing area and a short edge of the fingerprint sensor.

6. The fingerprint sensor according to claim 1, wherein the fingerprint sensor is elongated with an aspect ratio of 4:1 or greater.

7. A fingerprint sensor arrangement, comprising:
the fingerprint sensor according to claim 1; and
dielectric material covering the sensing area of the fingerprint sensor, the dielectric material having a non-uniform thickness profile defining a topography of a finger receiving surface of the fingerprint sensor arrangement.

8. An electronic device comprising:
a device housing with a curved portion having an opening; and
the fingerprint sensor arrangement according to claim 7 arranged in the opening of the curved portion of the device housing.

9. A fingerprint sensor comprising:
a plurality of sensing elements distributed across a rectangular sensing area with mutually opposite short sides and mutually opposite long sides, the sensing elements being arranged in a plurality of rows extending in parallel to the short sides and a plurality of columns extending in parallel to the long sides;
readout circuitry arranged in a readout area located adjacent to a short side of the sensing area; and
a plurality of readout lines for connecting each of the sensing elements to the readout circuitry, the readout lines in the plurality of readout lines extending in parallel to the long sides of the sensing area,
wherein, for each column of sensing elements in the plurality of columns, at least a first sensing element and a second sensing element in the column are simultaneously connectable to the readout circuitry via a first readout line and a second readout line, respectively, in the plurality of readout lines,
wherein the number of readout lines is the same as the number of columns, or twice the number of columns, or the same as the number of rows,
wherein, for each column of sensing elements in the plurality of columns, at least a number of sensing elements in the column, equal to one half of a number of sensing elements in a row of sensing elements, are simultaneously connectable to the readout circuitry via respective different readout lines in the plurality of readout lines.

10. A fingerprint sensor arrangement, comprising:
a fingerprint sensor comprising:
a plurality of sensing elements distributed across a rectangular sensing area with mutually opposite short sides and mutually opposite long sides, the sensing elements being arranged in a plurality of rows extending in parallel to the short sides and a plurality of columns extending in parallel to the long sides;
readout circuitry arranged in a readout area located adjacent to a short side of the sensing area; and
a plurality of readout lines for connecting each of the sensing elements to the readout circuitry, the readout lines in the plurality of readout lines extending in parallel to the long sides of the sensing area,
wherein, for each column of sensing elements in the plurality of columns, at least a first sensing element and a second sensing element in the column are simultaneously connectable to the readout circuitry via a first readout line and a second readout line, respectively, in the plurality of readout lines,
wherein the number of readout lines is the same as the number of columns, or twice the number of columns, or the same as the number of rows; and
dielectric material covering the sensing area of the fingerprint sensor, the dielectric material having a non-uniform thickness profile defining a topography of a finger receiving surface of the fingerprint sensor arrangement, wherein:
a cross-section of the finger receiving surface with a plane parallel to a short side of the sensing area is convex exhibiting a first radius of curvature; and
a cross-section of the finger receiving surface with a plane parallel to a long side of the sensing area exhibits a second radius of curvature greater than the first radius of curvature.

11. The fingerprint sensor arrangement according to claim 10, wherein the second radius of curvature is at least four times the first radius of curvature.

12. A method of operating a fingerprint sensor comprising:
a plurality of sensing elements distributed across a rectangular sensing area with mutually opposite short sides and mutually opposite long sides, the sensing elements being arranged in a plurality of rows extending in parallel to the short sides and a plurality of columns extending in parallel to the long sides;
readout circuitry arranged in a readout area located adjacent to a short side of the sensing area; and
a plurality of readout lines for connecting each of the sensing elements to the readout circuitry, the readout lines in the plurality of readout lines extending in parallel to the long sides of the sensing area,
wherein, for each column of sensing elements in the plurality of columns, at least a first sensing element and a second sensing element in the column are simultaneously connectable to the readout circuitry via a first readout line and a second readout line, respectively, in the plurality of readout lines, wherein the number of readout lines is the same as the number of columns, or twice the number of columns, or the same as the number of rows, wherein the sensing area of the fingerprint sensor has a longitudinal symmetry line, the method comprising the steps of:

reading out sensing signals from sensing elements in a first column at a first distance from the longitudinal symmetry line; and after having read out the sensing signals from the sensing signals in the first column, reading out sensing signals from sensing elements in columns on both sides of the longitudinal symmetry line, at distances from the longitudinal symmetry line being greater than the first distance.

* * * * *